United States Patent [19]

Huynh et al.

[11] Patent Number: 5,539,899
[45] Date of Patent: Jul. 23, 1996

[54] SYSTEM AND METHOD FOR HANDLING A SEGMENTED PROGRAM IN A MEMORY FOR A MULTITASKING DATA PROCESSING SYSTEM UTILIZING PAGED VIRTUAL STORAGE

[75] Inventors: Khoa D. Huynh, Miami; Glenn E. Brew, Boca Raton; Kenneth W. Christopher, Jr., Lighthouse Point; Michael S. Kogan, Delray Beach, all of Fla.

[73] Assignee: International Business Machines Corporation, Armonk, N.Y.

[21] Appl. No.: 862,911

[22] Filed: Apr. 3, 1992

[51] Int. Cl.[6] .................................................. G06F 12/02
[52] U.S. Cl. .................... 395/497.02; 395/413; 395/418; 395/600; 364/DIG. 1; 364/246.3; 364/254.3
[58] Field of Search ............................ 364/200 MS File, 364/900 MS File; 395/400, 425, 427, 497.01, 497.02, 497.03, 413, 415, 416, 417, 418, 419, 600

[56] References Cited

U.S. PATENT DOCUMENTS

| | | | |
|---|---|---|---|
| 3,942,155 | 3/1976 | Lawlor | 340/172.5 |
| 4,300,192 | 11/1981 | Couleur et al. | 395/425 |
| 4,821,169 | 4/1989 | Sites et al. | 395/425 |
| 5,012,408 | 4/1991 | Conroy | 395/425 |
| 5,210,844 | 5/1993 | Shimura et al. | 395/425 |

*Primary Examiner*—Eddie P. Chan
*Assistant Examiner*—Hiep T. Nguyen
*Attorney, Agent, or Firm*—Andrew J. Dillon

[57] ABSTRACT

A system and method for loading a segmented program into a memory for a multitasking data processing system utilizing paged virtual storage for processes is disclosed. A virtual address space having a plurality of pages for the segmented program is established. Segments of the segmented program suitable for packing end to end across page boundaries are identified. A virtual storage object over a contiguous portion of the virtual address space is defined and the segments identified for packing into the virtual storage object are mapped into the contiguous portion. Any segments not suitable for packing across page boundaries start on page boundaries in the virtual address space. Then segments corresponding to selected pages of the virtual address space are demand loaded into frames of the memory in the same manner in which they are addressed into the virtual address space.

23 Claims, 9 Drawing Sheets

SYSTEM AND METHOD FOR HANDLING A SEGMENTED PROGRAM IN A MEMORY FOR A MULTITASKING DATA PROCESSING SYSTEM UTILIZING PAGED VIRTUAL STORAGE

BACKGROUND OF THE INVENTION

1. Technical Field

The invention relates to efficient utilization of physical memory by virtual storage systems and more particularly to efficient storage of segments from application written for segmentation type virtual storage systems in a multitasking data processing system utilizing demand paging type virtual storage. Still more particularly, the invention relates to efficient utilization of physical memory in a virtual storage system for a multitasking operating system providing shared objects between processes.

2. Description of the Related Art

The term "virtual storage" is normally associated with a computer system that has the capability of addressing a memory space much larger than that available in the system's physical memory. Virtual storage is not a new concept. In fact, virtual storage capability first appeared in the Atlas computer system constructed at the University of Manchester in England in 1960. Today almost all general-purpose computers support virtual storage, with the possible exception of some real-time systems.

The key to the virtual storage concept is the disassociation of memory addresses referenced by a process from those used in the physical memory of a computer system. The addresses referenced by a process are called virtual addresses. The addresses used by the physical memory are called physical addresses. The range of virtual addresses to which a process may reference is called a virtual address space or process domain. Since the virtual address space, as seen by a process, is much larger than the limited amount of physical memory installed in the system, the virtual address space is divided into smaller blocks. Each of these blocks, when in use by a running process, will correspond to a certain block (of the same size) in physical memory. Since the amount of physical memory is limited, the blocks that are not in use will be kept on disk, out of memory. As the process executes, it will need to reference different blocks, and these blocks will be brought into memory dynamically. To make room for new blocks to be brought into the limited physical memory, some blocks that are no longer in use by the running process might be swapped out to disk. Thus the operating system must keep track of where in physical memory the various virtual storage blocks have been placed.

From a performance standpoint, there is some question as to whether the blocks should all be the same size, or of different sizes. When the blocks are the same size, they are called pages, and the associated virtual memory organization is called paging. When the blocks may be of different sizes, they are called segments, and the associated virtual memory organization is called segmentation. The Intel 80286 microprocessors support a segmentation type of virtual storage organization. Segmentation involves moving the entire segments in and out of memory. Each segment can be as small as one byte or can span over several Kbytes of physical memory (up to 64 Kbytes on the Intel 80286). Unused or infrequently used segments can be moved, swapped out to disk, or simply discarded if they have not been modified, to make room for new segments to be brought into memory. However, a segment cannot be fragmented; it must occupy one contiguous piece of physical memory. These features prevent the allocation of a segment larger than the physical memory, and make it very difficult to manipulate large segments. The task of finding or creating a large enough contiguous piece of physical memory to load a segment becomes increasingly difficult as the segment sizes grow much beyond the 64-KB limit imposed by the Intel 80286 architecture and operating systems manufactured by International Business Machines Corporation OS/2 Version 1.X. These problems, coupled with the fact that multiple segments must be simultaneously present in physical memory to begin the execution of a program, present insurmountable challenges to a segment-based virtual memory architecture. In addition, many non-Intel processors use a flat, non-segmented memory model preferred by many application developers.

Paging involves moving fixed-size chunks (pages) of code and data in and out of memory. To make room for newly referenced pages that are not present in memory, unused or infrequently used pages in memory can be swapped out to disk, or simply discarded (if they have not been modified). However, unlike segmentation, there is no need to move pages among frames in physical memory since all pages are of the same size and need not be contiguous in physical memory.

The architecture of the Intel 80386 and 80486 processors can support both paging and segmentation. The key feature of these processors is the support for 32-bit wide segments in a paging-based virtual memory environment. While segmentation is a feature that is not commonly found in other families of processors, such as the Motorola 68000 or RISC processors, the 32-bit wide segments can be used to simulate a flat, 32-bit wide virtual address space, which is a very common feature of other processors. On the Intel 80286, the segmentation hardware maps a selector and an offset through the appropriate descriptor table entry to a physical address. On the Intel 80386 and 80486, processors with paging enabled, another level of indirection exists between the selector mapping and physical memory: the linear address space. The linear space is a 32-bit wide flat or virtual address space which is mapped through the page tables to physical memory. If a selector is created to map the entire 4 Gbytes of the linear address space as code and another is created to map the same linear space as data, and if these selectors are loaded into an application's segment registers and are never changed, then, for all practical purposes, an application can view the underlying memory management as not having a segmented address space, but as having a flat address space.

An application may allocate regions within the flat, 32-bit linear address space. Such an allocated region is called an object. Conceptually, an object is like a segment in that it may be treated as a discrete entity for the purposes of certain operations. However, unlike segments, all objects addressable by a process in a paging environment can be referenced directly without the need to load any segment register with a special value. On the Intel 80386 processors, the use of paging not only permits the allocation of objects larger than the 64-KB limit, but also larger than the available physical memory. Paging also allows more efficient swapping and memory overcommit algorithms as the pages are fixed in size (4 Kbytes). Paging also eliminates all the pitfalls of the swap-file fragmentation problems present in segmentation systems.

An arena is a contiguous subset of the linear address space. There are three types of arenas: private, shared, and system. A private arena is analogous to the set of private selectors, and the shared arena is analogous to the set of shared selectors in the segmented memory model. The private and shared selectors are mapped through the Local Descriptor Table (LDT). The system arena is the portion of the linear address space used by the operating system itself. This is similar to the memory space mapped by the set of selectors in the Global Descriptor Table (GDT) in the segmented memory model used by the Intel 80286 processors.

The simplest and most obvious way to partition the flat, 32-bit linear address space into private and shared areas (arenas) is to put objects with private addresses at one end and objects with shared addresses at the other, and let them grow toward each other, much as one would manage two stacks at the same time. In the 32-bit wide OS/2, the private arena begins at the low end of the user's flat address space and the shared arena will start at the high end. The private and shared arenas will grow toward each other, but they may never overlap. The boundary between them depends on the requirements of the applications running on the system, but there are minimum and maximum values between which the boundary will be constrained to remain.

As its name implies, the private arena of a process is unique to that process, that is, each process has its own private arena to map its private code and data objects. However, the same cannot be said for the shared arena. The shared arena is shared across all processes running in the system. When a process references a Dynamically Linked Library (DLL), the DLL's code and data objects will be loaded into the shared arena. If a 16-bit wide DLL is referenced by a 16-bit wide process, the descriptors for the DLL would be allocated from the top end of the LDT of the process to map to its linear address space. Since the DLL can be shared by other processes in the system, the same descriptors would have to be allocated and reserved in the LDTs of all other processes. When one of these processes actually references the DLL, these reserved descriptors in that process' LDT would be initialized to map to the same DLL code and data segments. In other words, when a 16-bit wide DLL is loaded into memory, the same descriptor slots (selectors) will be allocated in the LDTs of all 16-bit wide processes running in the system. The next DLL loaded will be mapped by a different set of descriptors in all LDTs in the system. In short, each initialized descriptor in the shared arena will map to the same locations in the virtual memory (selector), linear memory (flat), and physical memory, regardless of which LDT the descriptor belongs to. LDT descriptors in the private arena are allocated from the bottom (low address) up, while descriptors for DLLs in the shared arena are allocated from the top (high address) down. Furthermore, LDT descriptors for each DLL to be loaded is also allocated from the higher addresses down.

As mentioned previously, the 32-bit wide OS/2 Version 2.0 will support both 16-bit and 32-bit applications. This means that the system must be able to understand both the selector:offset (16:16) addressing format used in 16-bit applications and the linear (0:32) addressing format used in 32-bit applications within the same process. There must be a simple method to translate a 0:32 address into a 16:16 address, and vice versa. Such an address translation process is referred to as address thunking.

In OS/2 1.X versions, the maximum amount of memory a process can own is limited by the amount of memory its LDT can map. On the Intel processors, an LDT can have 8192 descriptors, each mapping up to 64 Kbytes of memory. Therefore, the maximum amount of memory an application can own is 512 Mbytes. This amount excludes the system-owned memory mapped by the GDT, but it does include all shared memory allocated by all processes running in the system. In the 32-bit wide OS/2 Version 2.0, this limit has been retained for each process in order to have a one-to-one mapping between the 16:16 and 0:32 addressing formats. In other words, each descriptor in the LDT will map to a corresponding 64-Kbyte piece of the linear (flat) address space. This unique mapping between the LDT and the linear address space is called tiling. The first 512 Mbytes of the linear address space where tiling takes place is referred to as the Compatibility Region (CR).

With tiling, the conversion from 16:16 to 0:32 addressing formats, and vice versa, is performed by a short sequence of shift and add operations. For 16-bit applications, the base address of every segment will be equal to the 13 high-order bits of the selector (the index of the corresponding descriptor in the LDT) multiplied by 64 Kbytes. The low 3 bits in a selector indicate the table and ring protection levels, and therefore are not representative of distinct memory addresses. Thus, the conversion from a 16:16 (selector:offset) address to a 0:32 (linear, flat) address can be done via this formula:

$$linaddr=(selector>>3)<<16+offset$$

By using the inverse of the algorithm above, we can construct a valid 16:16 address for any byte within a tiled object as follows:

$$offset=linaddr\ \&\ 0xFFFF$$

$$selector=((linaddr>>16)<<3)|4|CPL$$

Despite its advantages in thunking (address conversions between the 16:16 and 0:32 formats), tiling is not the perfect solution. New applications that wish to use existing 16:16 code must be careful of the tiling boundaries within objects. In particular, a single logical entity, such as a buffer or a name string, must no cross a 64-Kbyte boundary if it is to be used by 16:16 code since the entity would not be completely accessible using a single selector. Language tools must provide support to insure that these mistakes are not made.

Efficient utilization of limited physical memory is served by sharing of data objects and code objects between different processes on a multitasking operating system. A virtual storage system should provide constraints on the organization of the virtual storage for each process that will permit sharing of frames in physical memory between processes.

SUMMARY OF THE INVENTION

It is an object of the invention to provide a system and method for efficiently loading a segmented program into a memory for a multitasking data processing system utilizing paged virtual storage for processes.

It is another object of the invention to provide a system and method to provide efficient utilization of memory upon loading a segmented program.

These and other objects are achieved as is now set forth. A program written for a segmented virtual storage system is loaded into memory. A virtual address space having a plurality of pages for the segmented program is established. Segments of the segmented program suitable for packing end to end across page boundaries are identified. A virtual storage object over a contiguous portion of the virtual address space is defined and the segments identified for packing into the virtual storage object are mapped into the contiguous portion. Any segments not suitable for packing across page boundaries start on page boundaries in the virtual address space. Then segments corresponding to selected pages of the virtual address space are demand loaded into frames of the memory in the same manner in which they are addressed into the virtual address space.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
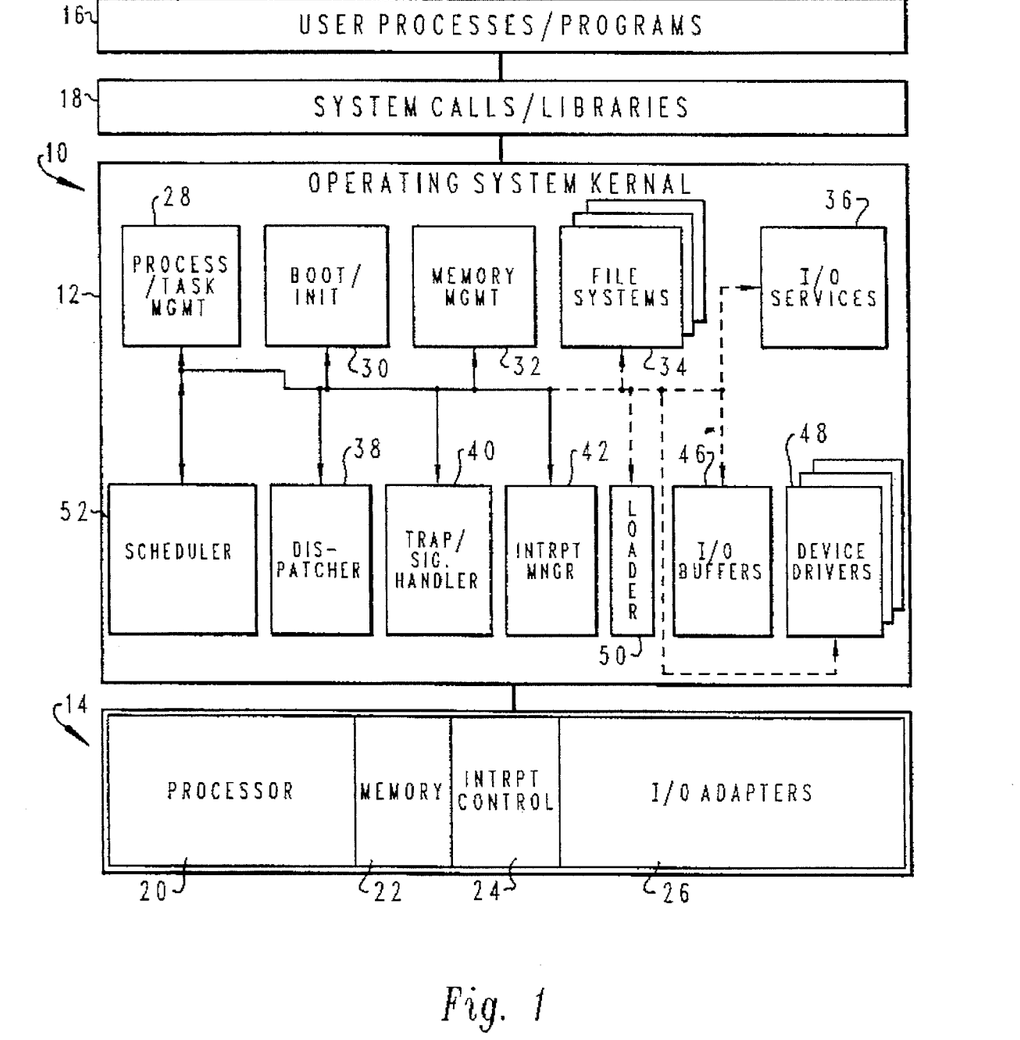
FIG. 1 is a high level block diagram software and hardware components of a data processing system which may be utilized to implement the method and system of the present invention.

With reference now to the figures and in particular with reference to FIG. 1, there is depicted a high level block diagram illustrating software and hardware components of a data processing system 10 which may be utilized to implement the method and system of the present invention. Data processing system 10 includes an operating system kernel 12 which resides in a hardware system 14. The operating system is preferably provided by a disk operating system such as the OS/2® version 2.0 operating system available from International Business Machines Corporation. Hardware system 14 includes at a minimum a central processing unit (CPU) 20 and a computer memory Hardware system 14 further preferably includes an interrupt controller 24 and input/output adapters 26.

Also depicted in FIG. 1 are user processes/programs 16 which, in a manner well known to those skilled in the art, access selected procedures within operating system kernel 12 by means of system calls which are depicted at reference numeral 18. As is typical in such systems selected procedures within operating system kernel 12 are designed to be called or invoked by applications within data processing system 10 and thereafter the task will return to the user program which invoked the operating system kernel procedure. In this manner, operating system kernel 12 acts as an interface between the user of data processing system 10 and hardware system 14.

Operating system kernel 12 is utilized to provide an environment in which various processes or programs may be executed. Operating system kernel 12 provides for the efficient utilization and prevents user application programs from interfering with the proper operation of data processing system 10 by controlling the creation and alteration of files, the control of input/output devices and the provision of multiple device drivers which permits data processing system 10 to interface with various external devices. Operating system 12 provides both multitasking capability for a plurality of user application based processes in computer memory 22 and a virtual storage system for each such process.

Still referring to FIG. 1, it may be seen that operating system kernel 12 includes multiple subsystems, including process/task management system 28 which is utilized to provide task creation, deletion, status and synchronization functions. Boot/initialization system 30 typically is embodied in microcode in non-addressable memory and is utilized to load the operating system into computer memory 22.

Next, memory management system 34 is depicted. Memory management system 32 allocates and deallocates portions of computer memory 22 for data processing system 10. File systems 34 are preferably utilized to control the creation and deletion of files. A file is simply a named set of records stored or processed as a unit by a data processing system. Another aspect of files typically addressed within an operating system kernel is control of access to the files. Access control is utilized to ensure that an access to a file or directory is checked for correctness. Next, input/output services system 36 is depicted. Input/output services system 36 is preferably a functional unit within operating system kernel 12 which controls peripheral hardware.

Next, dispatcher 38 is depicted within operating system kernel 12. Dispatcher 38 places jobs or tasks into execution. Dispatcher 38 is thus responsible for providing multi-tasking and operates in conjunction with a scheduler to implement a particular type of scheduling system.

Trap and signal handler 40 is also depicted within operating system kernel 12 and is utilized to respond to traps and signals typically activated by hardware system 14. Among the signals generated by hardware 14 are page fault signals indicated operations relating to computer memory 22 and auxiliary memory accessed through I/O adapters 26. Such page fault signals are subdivided into two categories corresponding to the type of memory being accessed. Page reclaim operations relate to a memory paging operation limited to computer memory 22. A page fault requiring I/O operations is the second category. Any auxiliary memory operation requires a relatively large amount of time to execute compared to central processor operation and page reclaims.

Interrupt manager 42 preferably manages interrupt handlers which are set up by the operating system kernel 12 and kernel extensions to take whatever action is necessary to respond to the occurrence of an interrupt. Loader system 44 is also depicted within operating system kernel 12 and, as those skilled in the art appreciate, is typically a routine which loads programs, libraries and kernel extensions. Input/output buffers 46 are depicted within operating system kernel 12 are utilized to temporarily store data during transfer from one hardware device to another in order to compensate for possible differences in data flow rate.

A plurality of device drivers 48 are depicted. Device drivers 48 are typically utilized to attach and use various peripheral devices which may be coupled to data processing system 10. For example, displays, keyboards, printers, floppy disk drives, fixed disk drives and other auxiliary devices are typically controlled from data processing system 10 utilizing a device driver associated with the particular auxiliary device selected for control. Device drivers 48 are installable and operating system kernel 12 is adapted to admit additional and utilize additional units.

Next, scheduler 52 is depicted. Scheduler orders specific tasks for dispatch to the processor upon indication that a task is "ready to run". Good design of the scheduling algorithm provides both effective use of central processing unit 20 by the various tasks and smooth response to user requests of data processing system 10.

Next, loader 50 is depicted. Loader 50 accesses programs stored on peripheral storage devices, such as disk drives, and loads selected portions of a program in computer memory 22 to create a process which may be executed on CPU 20. Through utilization of the process and method of the present invention loader 50 packs particular segments from applications into frames of the computer memory 22.

In a demand paging virtual storage system, all memory allocation will be done with page-size granularity. Each 16-bit wide segment, no matter how small in size it is, will occupy at least one physical frame, which in the Intel 80386 architecture occupies 4Kbytes. This can result in excessive internal fragmentation in physical memory, especially if many segments terminate well off page boundaries. Packing the segments end-to-end in physical memory eliminates the internal fragmentation problem, and can result in substantial savings in the physical memory requirements. Many existing applications, such as Microsoft Excel, Lotus 1-2-3, or IBM Office Vision/2, have many small segments that can be packed together in physical memory utilizing the system and method of the present invention.

In order to pack segments in physical memory, the requirement that every segment must start on a frame boundary in physical memory and on a 64-Kbyte boundary in the linear address space must be removed. To remove this requirement, untiling of some portions of the tiled Compatibility Region is required.

The invention provides a method and system for packing the following types of segments in physical memory: 16-bit wide private code segments; 16-bit wide private read-only data segments; 16-bit wide shared code segments; and 16-bit wide shared read-only segments (i.e., read-only data and resource segments).

Code and read-only data segments should never be reallocated to larger sizes during execution, so packing them creates no reallocation problems. On the other hand, data segments that can be modified have a high probability of being reallocated to larger sizes, so packing them would require reallocation overhead. In addition, memory accessibility problems would occur with modifiable segments, since more than one segment can and typically does share the same physical frame.

Figure 2:
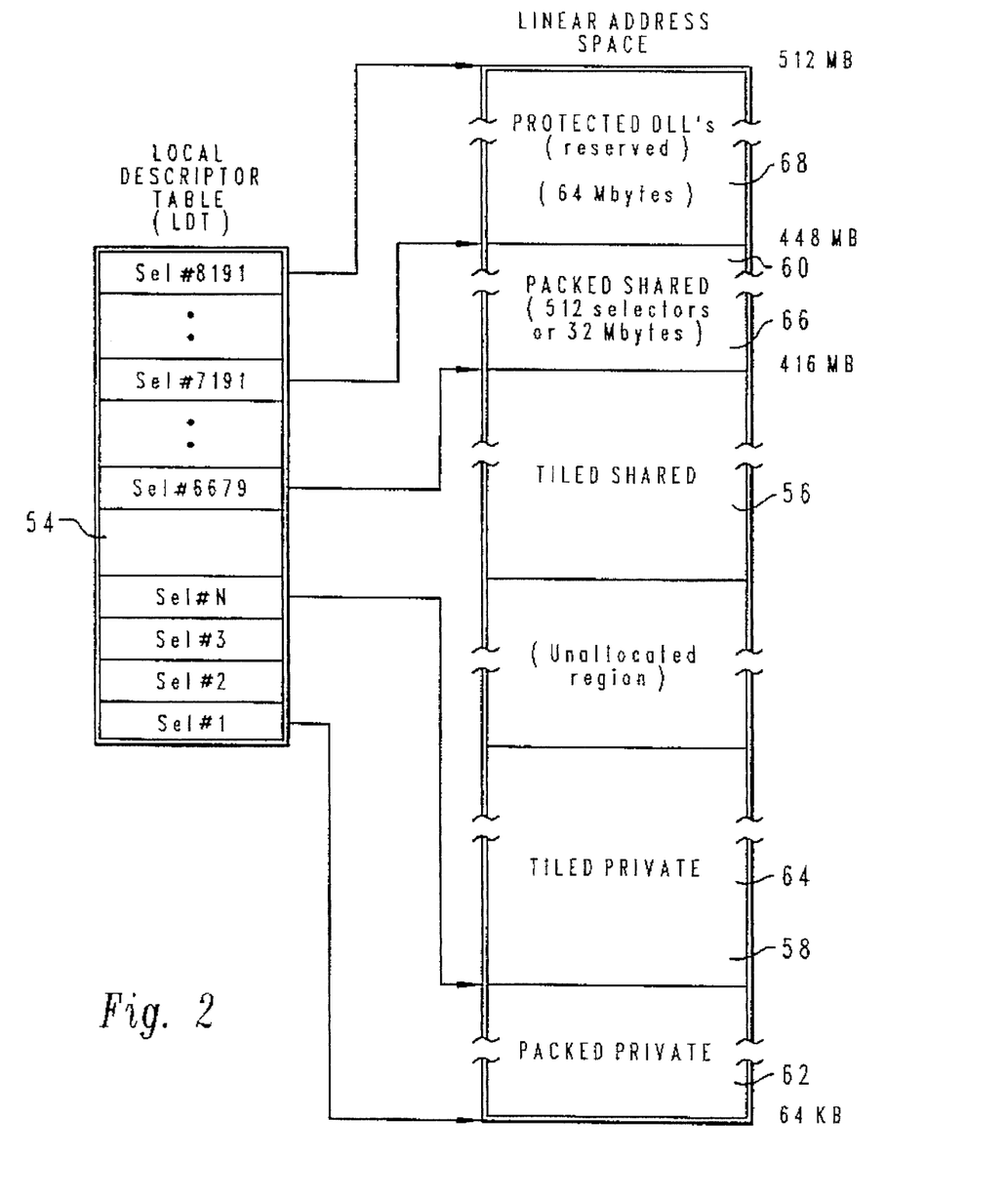
FIG. 2 is a block diagram of data structures used to implement the system and method of the present invention.

FIG. 2 illustrates the structure of a Local Descriptor Table 54 and a linear address space 56 for a virtual storage space for a process. Linear address space 56 is a 32-bit wide flat virtual address space. To pack 16-bit wide segments in both the private arenas 58 and shared arenas 60, the 32-bit wide linear address space mapped by the LDT 54 for each process will be divided into 4 different regions: packed private 62, tiled private 64, tiled shared 66, and packed shared regions 68.

The 16-bit wide code and read-only data segments are packed at load time, provided they meet certain requirements. These requirements are related to the segment size, the number of segments contributing to fragmentation, and the wasted space in a frame. More sophisticated requirements can also be attached, such as a segment will be packed if and only if doing so would actually reduce the page fragmentation in physical memory.

Important to consider is the type of memory allocated for the packed segments. In the prior tiling design for segmentation based applications, the memory allocated for code and read-only data segments is discardable. This means that no swap file space is reserved for these segments, since they can be readily loaded from auxiliary memory if needed again after being discarded. However, for packed segments, allocating swappable memory (and thus, reserving the swap file space for the packed segments) is an attractive method because the packing process needs to be performed only at load time. If the packed segments are not referenced frequently, and if memory is needed for something else, they would be swapped out to disk in the packed format. Later on, they can be loaded back into memory in the exact same format. However, this method would increase the swap file size as swap space must be reserved for segments that would have been marked "discardable" if they are tiled. In other words, there is a trade-off between the reduction in memory size versus the increase in swap file (auxiliary storage) size. Additional conditions to segment packing to take into account this trade-off can be done. One condition is the ratio of the potential physical memory savings if segments are packed to the potential increase in the swap file size. Another condition is the ratio of the available physical memory to the amount of free auxiliary storage space where the swap file resides.

Figure 3:
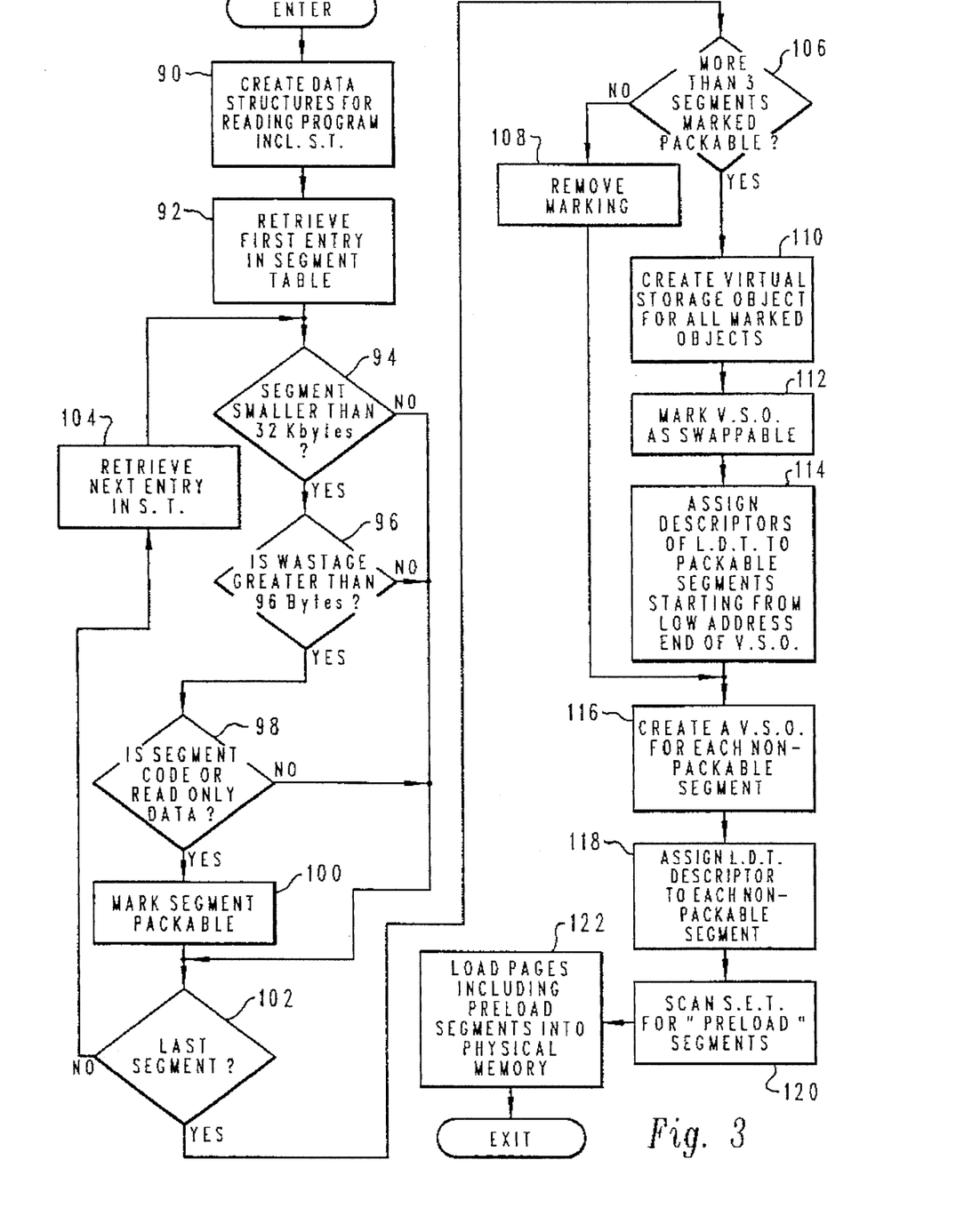
FIG. 3 is a high level logical flow chart illustrating a software implementation which may be utilized to execute the system and method of the invention on a data processing system.

FIG. 3 is a flow chart illustrating a process loading of segments for a program into physical memory 22. The process is entered at step 90 with creating of data structures for the program to be loaded including particularly a segment table. Next at step 92, the first entry in the segment table is retrieved. What occurs in the subsequent steps is determination if the segment represented by the first entry, as well as any other entries from the table, represent segments qualifying for packing. At step 94, it is determined if the segment is smaller than 32-Kbytes. If yes, at step 96 it is determined if wastage of a frame utilized to store the segment will be greater than 96-bytes. To determine wastage, a modulo operation is performed on a segment utilizing the page size supported by the system. The remainder is then compared to the basic page. The parameters used are implementation and may be changed in specific applications. If yes, at step 98 it is determined if the segment is code or read-only data. If yes, the segment is marked as packable at step 100. The no branches from steps 94, 96 and 98 skip step 100 and rejoin the process at step 102 where it is determined if the just analyzed segment was the last segment from the segment entry table. If not, the NO branch is followed to step 104 where the next entry in the segment entry table is recovered and the process is then returned to step 94 for evaluation of that segment.

Once all segments have been analyzed for qualification for packing, step 106 is executed to determine if more than three segments were marked as packable. If not, the marking of the segments as packable is removed at step 108 and the process skips forward to step 116 for loading of the program into memory without packing. If more than 3 segments qualify, step 110 is executed to create a virtual storage object for the objects marked as packable. The number "3" is implementation specific. The virtual storage object is a contiguous block in the domain for the process. At step 112, the virtual storage object is marked as swappable. At step 114, descriptors of the local descriptor table are assigned to packable segments starting from the low address end of the virtual storage object created at step 110. By assigning descriptors of a local descriptor table, the segment starting from the low address end of the virtual storage object, applicability of the process both to private segments and to shared segments is preserved.

At step 116, a virtual storage object is created for each non-packable segment from the program. Next, at step 118, a local descriptor table descriptor is assigned to each non-packable segment. At step 120, the segment entry table is scanned to identify all "preload" segments. So called "preload" segments are those segments actually loaded into physical memory at the time of creation of a process for an application. Little used segments of the application may be left in auxiliary memory until occurrence of a demand from the process for the segment actually requires its transfer into computer memory 22. At such time the page(s) to which the segment is mapped are loaded in free frames in memory 22. At step 122, preload segments are read into physical memory 22. Only those segments that are marked "preload" are loaded into memory during load time and other segments will be loaded on demand. Thus, where two packed segments are adjacent or a page, but only one is marked "preload" only the one marked preload is loaded. Thus, if the remaining segment crosses a page boundary, the second page need not be loaded into a memory frame during load time. Alternatively, "preload" can be ignored completely and pure demand loading can be utilized.

A request to free any particular packed segment will be ignored by operating system kernel 12. All packed segments of an ".EXE" (i.e. an executable file) or ".DLL" (dynamic linked library file) are freed as one object later when its related process is terminated (either normally or abnormally). This is appropriate for two reasons. There is only one virtual memory object for all packable segments in an .EXE or .DLL file. The linear space occupied by a packed segment cannot be reused for another segment. All packed segments in the .EXE or .DLL file have already been allocated linear space at load time, and the tiled segments (which can be dynamically allocated and deallocated) cannot use the packed linear space anyway.

Figure 4:
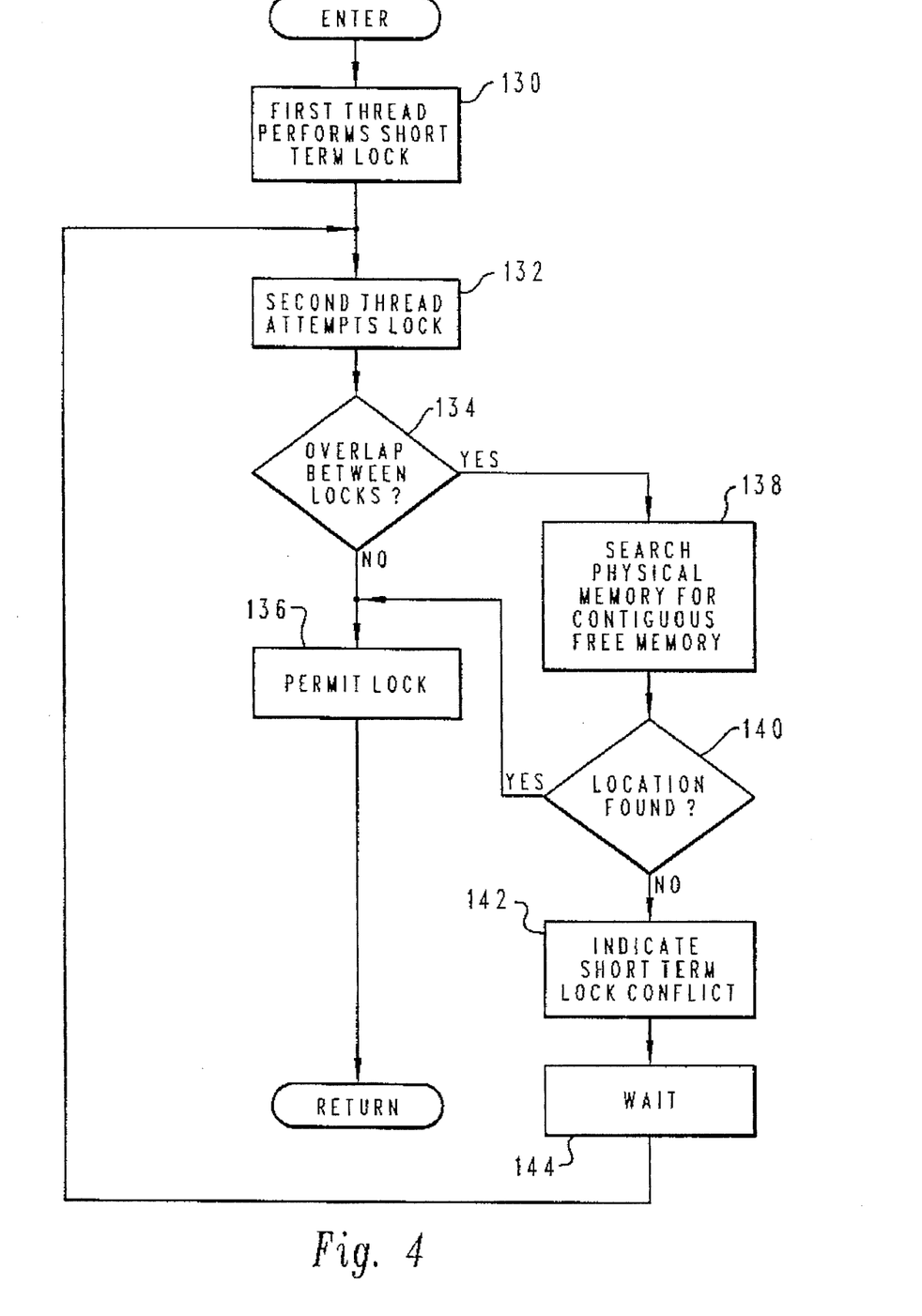
FIG. 4 is a high level logical flow chart illustrating a software implementation of a locking feature of the system and method of the invention on a data processing system.

FIG. 4 illustrates implementation of short-term locks on physical memory 22 during program loading. When loading a segment, the program loader 50 needs to perform a short-term lock (less than 10 seconds) on a contiguous buffer in physical memory 22 in order to do the I/O read from disk. In a multitasking environment, there can be multiple threads calling the loader 50 to load adjacent segments that are packed in physical memory 22. Potential conflicts must be resolved. The conflict resolution process is entered at step 130.

At step 130, a first thread performs a short-term lock on a number of contiguous frames (a buffer) and is in the process of doing I/O to read in the segment from disk into those frames. Since the segment is packed, it does not have to start and end on page boundaries, so an adjacent segment can share the same physical page as the segment being loaded.

At step 132, a second thread tries to lock down a number of contiguous pages. If a segment to be loaded is an adjacent segment to a segment being loaded by the first thread, then a conflict occurs (step 134). If the segment is packed adjacent to the segment being loaded in the first thread, one of the pages (i.e., the one that is shared by the two segments) is already locked down. Since the buffer for the second segment must be contiguous starting from the page already locked down, the page manager will try to find enough free frames in memory 22, which are contiguous to the frame already locked down, in order to read in the second segment (step 138). If a buffer is located (the YES branch from step 140), the second thread is permitted a lock to that buffer at step 136.

If the page manager cannot find enough free contiguous pages for the second segment (the NO branch from step 140), the page manager will return a signal (step 142), indicating that there is a conflicting short-term lock. To prevent this problem from occurring, loader 50 is modified so that if it receives an error from the page manager indicating a conflicting short-term lock, it will wait for the existing short-term lock to go away, and then try again (step 144).

A similar problem can occur if the first thread is doing a long-term lock on a packed segment. In this case, the system cannot wait for the long-term lock to go away. The most obvious solution would be to lock down the whole virtual memory object, which contains all packed segments for an .EXE or .DLL file, whenever there is a long-term lock performed on one of the packed segments. This solution is not very desirable since we will be locking down more than what we need, but it works. However, since only code and read-only data segments are packed, the probability of having a long-term lock on a packed segment is very small.

Figure 5:
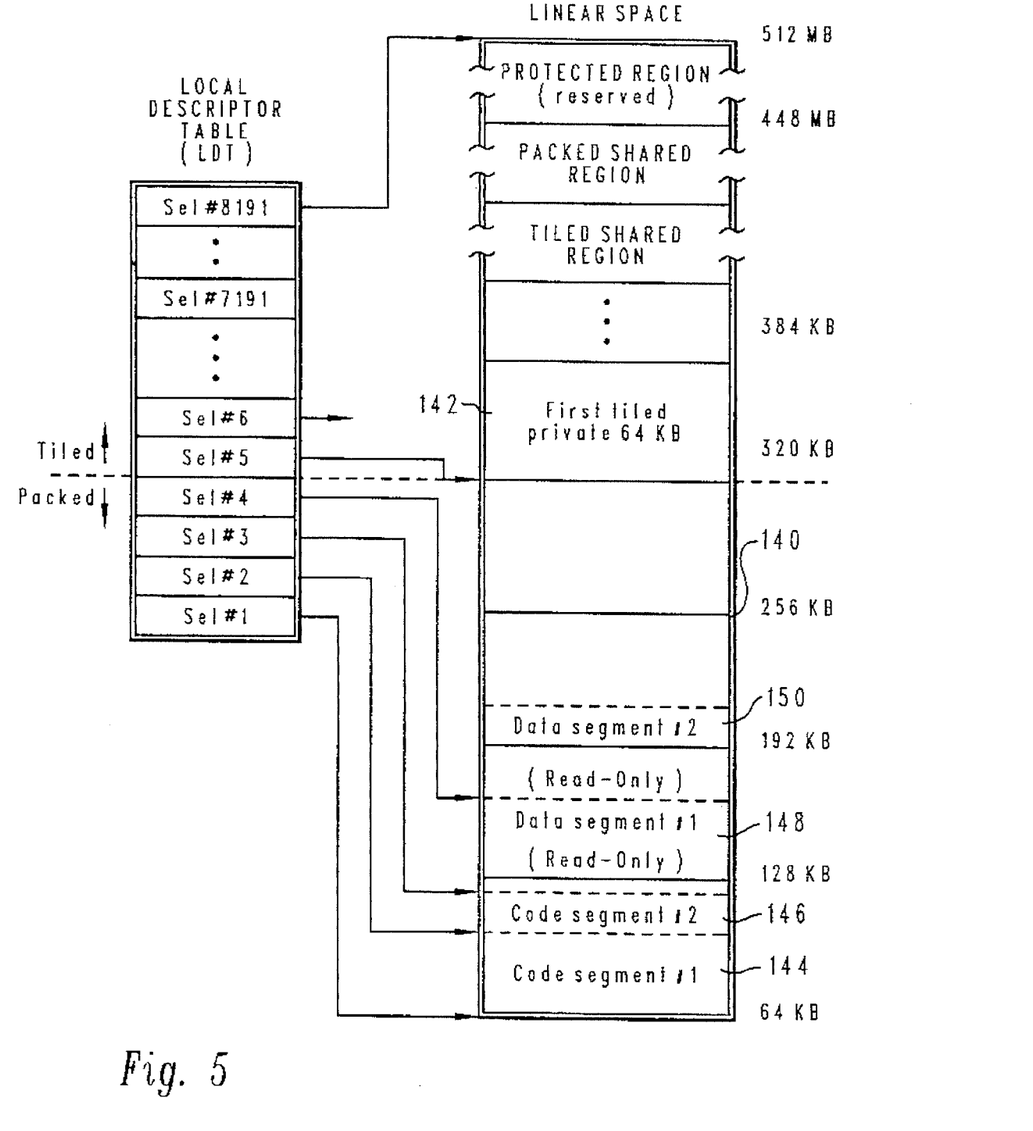
FIG. 5 is a block diagram of data structures used to implement the system and method of the present invention.

FIG. 5 illustrates "untiling" a portion of a Compatibility Region to pack 16-bit wide code and read-only data segments in the private arena of a process. The private arena of a 16-bit wide process would be divided into two regions: the lower region 140 is packed and not tiled, and the upper region 142 of the arena is tiled as normal. The LDT descriptors for the 16-bit wide segments that are packed would map to the packed linear address space 140, while the descriptors for tiled segments would map to the tiled linear space 142. Note that there is some "dead" linear space between the last packed segment and the first tiled 64-Kbyte linear space. Two code segments 144 and 146 and two read-only data segments 148 and 150 are packed end-to-end in the linear address space. Thus, four descriptors map to the packed region, and the remaining descriptors map to the tiled region. Normally, the boundary between the packed and tiled regions of the Compatibility Region will be different for different processes, depending on the number of segments that can be packed in each process. However, for each process, this boundary will remain unchanged during execution, once the initial process loading is completed.

Figure 6:
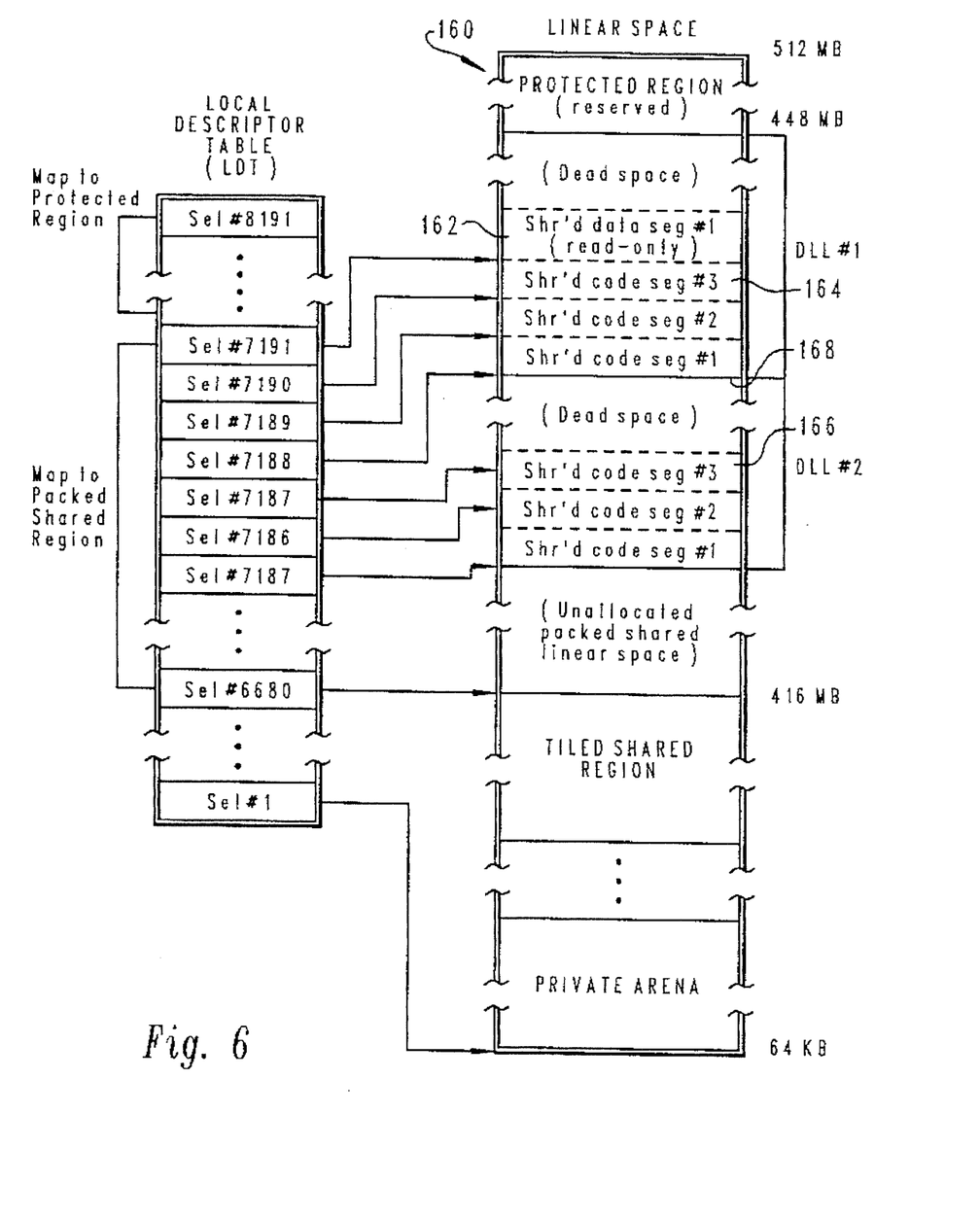
FIG. 6 is a block diagram of data structures used to implement the system and method of the present invention.

FIG. 6 shows how 16-bit wide code and read-only data segments in the shared arena 162 can be packed in a linear address space 160. The read-only segments can include regular read-only data segments or resource segments used by an operating system presentation layer such as Presentation Manager (PM) available from International Business Machines Corporation.

The upper 1000 descriptors in the LDT of a process are normally reserved to map the protected region. This corresponds to the top 64-Mbytes of the Compatibility Region.

To pack segments in the shared arena 162, the shared arena is partitioned into two regions: the packed (untiled)

region 164 and the tiled region 166; in addition to the protected region. Packed region 164 is used to map the 16-bit wide code and read-only segments, while the tiled region 166 maps other 32-bit wide and pageable 16-bit wide shared code and writable data objects. Because of the fact that the shared arena 162 is mapped across all processes running in the system, and because the DLLs are loaded into memory at different times by different processes, the boundary between the packed and tiled regions in the shared arena must be fixed. As a result, we need to reserve a fixed number of descriptors (across all LDTs in the system) for the 16-bit wide shared segments to be packed. In the preferred embodiment, the default for this number of reserved (shared) descriptors is 512. Boundary 168 is descriptor #7188, which maps to the first tiled 64-Kbyte linear space below the packed region 164.

As in the tiled shared region, the DLLs in the packed shared region are allocated virtual memory from the high-address end down in the order in which they are loaded into memory. However, within each virtual memory object for each DLL in the packed shared region, the LDT descriptors for the packed segments are packed from the low-address end up. In other words, the first packed segment of a DLL will start at the low-address end of its virtual memory object; subsequent segments of the same DLL will stack up above the first segment toward higher addresses in the linear address space. This is similar to an .EXE file, where segments are packed from the low-address end up. This scheme for packing DLL segments is very efficient in that it allows use of much common code to pack both .EXE and .DLL segments. DLLs are still allocated virtual memory from the high-address end down in the packed shared region.

The invention provides a system and method for packing segments for an application written for a segmented virtual storage system into pages of a demand paging virtual storage system. This provides compatibility for applications written for Intel 80286 based personal computers utilizing IBM's OS/2 Version 1.X operating systems with later machines utilizing Version 2.0 and later of the OS/2 operating system. The 1.0 versions family and 2.0 versions family differ also in that the groups utilize different address formats.

The tiling design on the 32-bit wide OS/2 Version 2.0 allows fast translation between a 16-bit wide address (16:16 format) and a 32-bit wide address (0:32 format). However, the 16-bit wide segments that are packed in the linear space (and in physical memory as well) are in the packed or untiled areas of the Compatibility Region. There is no tiling in these areas. Consequently, to convert a 16:16 address of a packed 16-bit wide data buffer to a corresponding 0:32 address, the short sequence of shift and add operations described previously for tiling cannot be used. By the same token, if a 32-bit wide application passes a 0:32 address of some data buffer to a 16-bit wide process API, the 32-to-16-bit address conversion cannot be done by a series of simple operations.

In the current memory management design for OS/2 Version 2.0, the very first descriptor of each LDT is "reserved" for system use. That is, the descriptor 0 (selector 0x07H) cannot be used to map any code or data segment. This "reserved" descriptor 0 is, in fact, a read-only descriptor that maps to the LDT itself. Therefore, any process can read the contents of its own LDT at ring 3 (the lowest level of privilege on Intel processors).

The thunking processes described below are particular to the architecture of Intel microprocessors.

Figure 7:
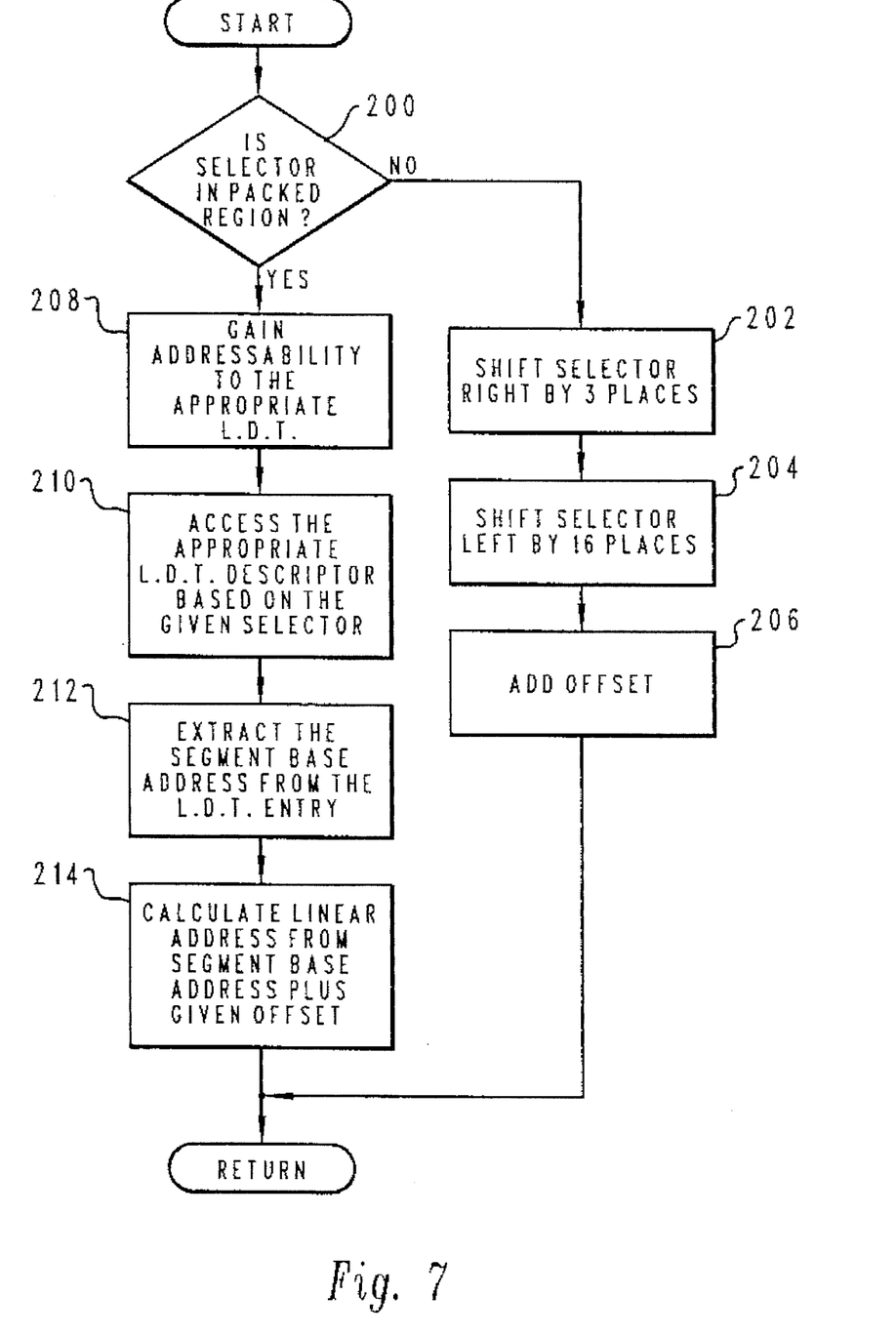
FIG. 7 is a high level logical flow chart illustrating a software implementation of a thunking routine utilized to implement the system and method of the present invention.

The process for thunking from 16:16 to 0:32 address format is illustrated in FIG. 7. Given a 16-bit wide address in selector:offset format, the corresponding 32-bit linear address can be found. The process is entered at step 200 where it is determined if the selector of the 16-bit wide address is in a packed region. If not, the conversion algorithm provided by steps 202, 204 and 206 is utilized along the NO branch from step 200. This procedure is the conventional short sequence of shift and add operations wherein the base address of every segment will be equal to the 13 highest order of bits of the selector multiplied by 64-Kbytes. The lowest 3 bits in a selector indicate the table and ring protection levels and therefore are not representative of distinct memory addresses. Thus, the conversion from a "selector:offset" address to a linear address can be done by shifting the selector to the right by 3 places. The last 3 places in the selector indicate table and ring protection levels in the Intel architecture. Then shifting the selector to the left by 16-bits to perform the multiplication indicated. Then the offset provided by the second 16-bits of the address may be added to generate a linear address.

If a selector is in a packed region, the YES branch from step 200 leads to step 208. At step 208, the process gains addressability to the appropriate local descriptor table. At step 210, the local descriptor table is accessed based upon the given selector. At step 212, the segment base address from the entry in the local descriptor table is extracted and at step 214, the given offset is tacked to the segment base address to generate a resulting linear address.

Figure 8:
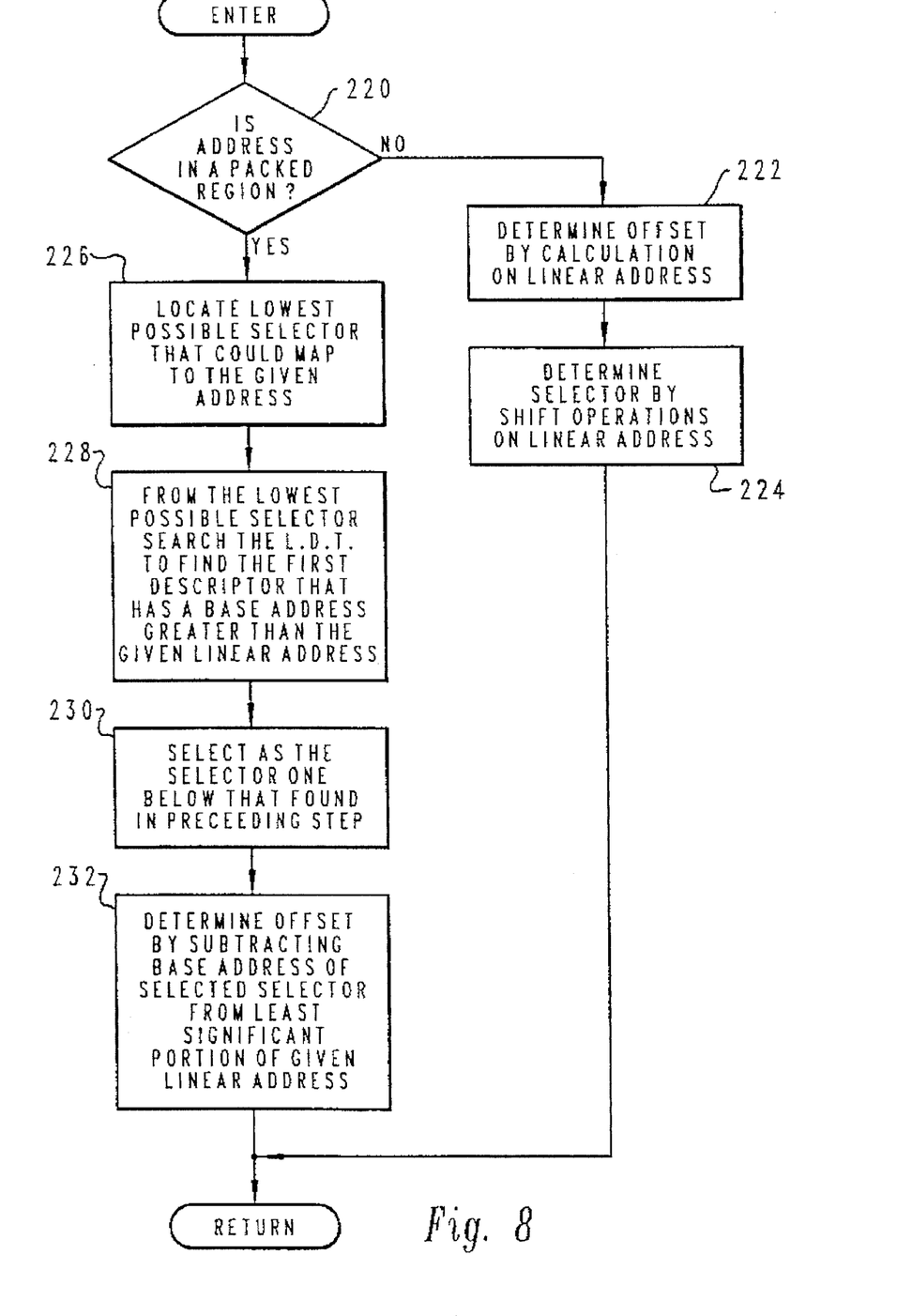
FIG. 8 is a high level logical flow chart illustrating a software implementation of a thunking routine utilized to implement the system and method of the present invention.

FIG. 8 illustrates thunking from a linear address to an address of the selector:offset type. The process is entered at step 220 where it is determined if the linear address to be converted is in one of the packed regions of a virtual address space. This is done by comparing the address with the boundaries of the packed regions. Boundary addresses are maintained in a special data structure for that purpose. The NO branch from step 220 is taken if the linear address address is indicated to be in the unpacked regions. Steps 222 and 224 represent that conversion process wherein offset is determined by performing an AND operation between the linear address and the hexadecimal number 0000FFFF. The selector is determined by first shifting the linear address to the right 16-bits. Then shifting that result to the left 3-bits. The result of that operation is ORed with hexadecimal 4 and that result is ORed with the current priviledge protection level number.

Where a selector is indicated to be in a packed region, the YES branch from step 220 is followed to step 226. At step 226, a selector X is determined by finding the lowest possible selector that could map to the given linear address. This is done by executing the process described with reference to step 224. Next, step 228 is executed to provide a search of the local descriptor table beginning from the lowest possible selector found in step 226. The purpose of the search is to find the first descriptor that has a base address greater than the given linear address. Next, step 230 is executed where the selector one below that found in step 228 is selected. Next, at step 232, the offset is determined by subtracting base address of the selector from the least significant 16 bits of the given linear address.

Translation of addresses for segments in the packed regions are very infrequent. Even when performed, most linear searches can be done in less than 5 steps due to the fact that the search does not begin at the beginning of the packed region. If greater efficiency is required, a more sophisticated binary search may be implemented.

Figure 9:
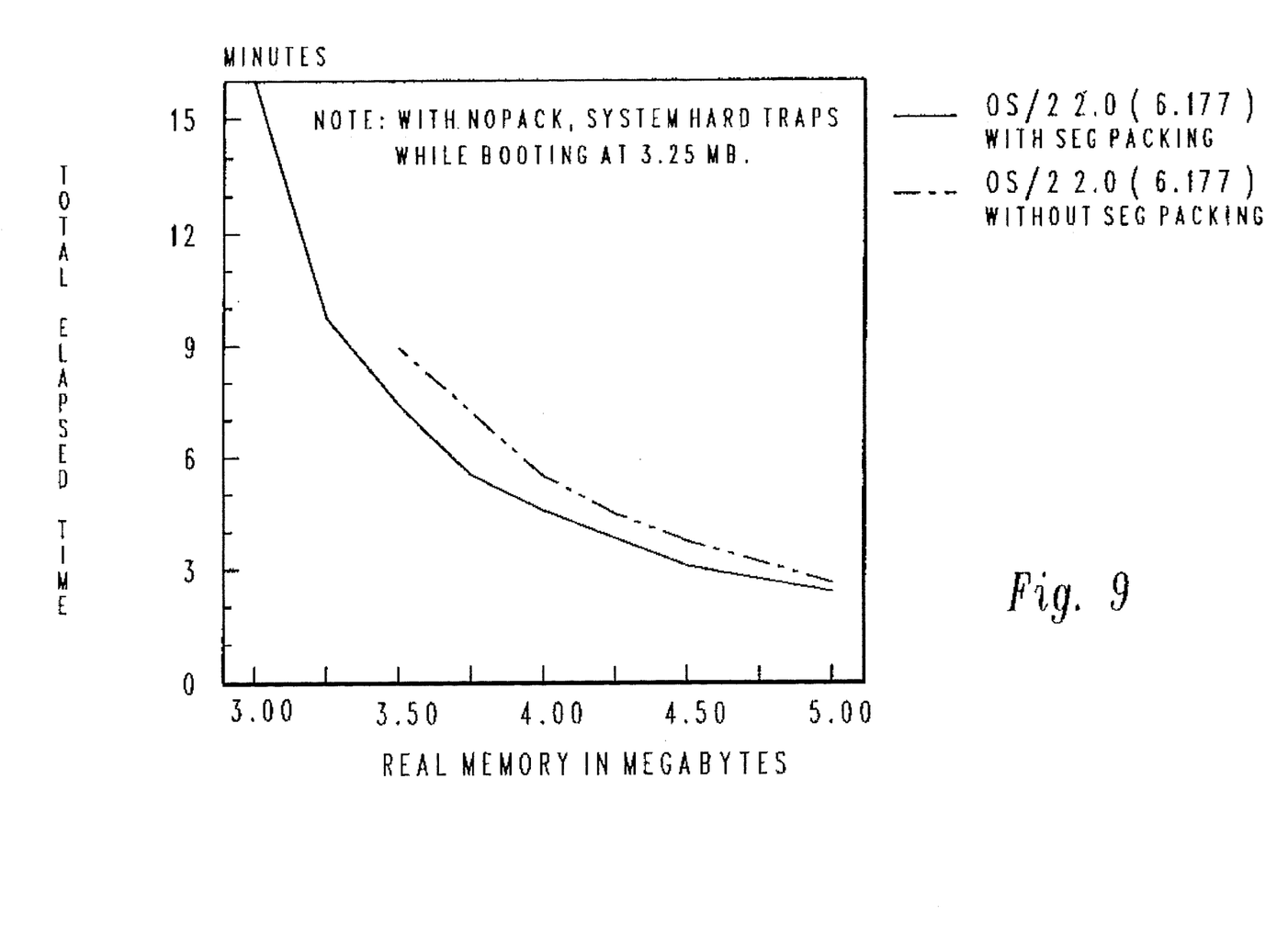
FIG. 9 is a graph illustrating performance enhancement provided by utilization of the system and method of the present invention.

FIG. 9 is a graph illustrating knee curve data for concurrent execution of Lotus 1-2-3/G and Word Perfect. The hatched line is an OS/2 Version 2.0 operating system without segment packing and the solid line is the same system provided with segment packing. The personal computer in which the processes were executed was a PS/2 Model 70 available from International Business Machines Corporation. The computer utilizes an Intel 80386DX microprocessor with a 20 megahertz clock. Execution of identical jobs in this multitasking environment indicates substantial reduction in elapsed time for completing processing where real memory is of restricted capacity. The system and method of the present invention reduce internal fragmentation while supporting execution of 16-bit wide, segment based applications and dynamic link libraries designed for operating systems utilizing a segmented virtual storage system. The reduced demand on physical memory requirements results in an increase in responsiveness of the computer where a physical memory is constrained or where a heavy overcommit of memory capacity exists, such as can occur in a multitasking environment. The discontinuance of the line in FIG. 9 for OS/2 without segment backing below 3.25 megabytes in physical memory indicated that the test system failed to boot because of excessive requirements for physical memory.

While the invention has been particularly shown and described with reference to a preferred embodiment, it will be understood by those skilled in the art that various changes in form and detail may be made therein without departing from the spirit and scope of the invention.

What is claimed is:

1. A method of loading a segmented program into a memory for a multitasking data processing system utilizing paged virtual storage for processes, the method comprising the steps of:

designating a segmented program which includes a plurality of segments for loading into the memory;

establishing a virtual address space having a plurality of pages for the segmented program;

identifying segments of the segmented program for packing which are not modified in size during execution of said segmented program;

establishing a virtual storage object over a contiguous portion of the virtual address space;

mapping the segments identified for packing into the virtual storage object end-to-end across page boundaries; and loading selected segments identified for packing into frames of the memory in accordance with their mapping into the virtual storage object.

2. A method of loading a segmented program into a memory for a multitasking data processing system utilizing paged virtual storage for processes as set forth in claim 1, wherein the step of mapping includes the steps of:

generating a descriptor table for segments;

marking the virtual storage object as swappable; and assigning a descriptor from the descriptor table to each segment identified for packing beginning at a selected address within the virtual storage object.

3. A method of loading a segmented program into a memory for a multitasking data processing system utilizing paged virtual storage for processes as set forth in claim 2, the method further comprising the steps of:

creating a virtual storage object for each segment of the segmented program not identified as packable; and assigning a descriptor linking each segment not identified as packable to its virtual storage object.

4. A method of loading a segmented program into a memory for a multitasking data processing system utilizing paged virtual storage for processes as set forth in claim 3, wherein the step of loading includes the steps of:

locating segments of the segmented program which are marked for loading upon creation of a process; and responsive to any portion of a marked segment being mapped to a page in the virtual address space, loading the marked segments mapped to the page into a frame of the memory.

5. A method of loading a segmented program into a memory for a multitasking data processing system utilizing paged virtual storage for processes as set forth in claim 1, wherein the step of identifying segments of the segmented program for packing further comprises:

determining whether a segment is smaller in size than a preselected maximum limit;

determining whether the segment is fixed in size;

performing a modulo operation on the size of the segment and a size for a page supported by the multitasking data processing system to generate a result;

examining the result of said modulo operation to determine whether the segment would leave a block in a frame larger in size than a preselected minimum limit; and qualifying for packing only those segments meeting all three of the preceding conditions.

6. A method of loading a segmented program into a memory for a multitasking data processing system utilizing paged virtual storage for processes as set forth in claim 5, and further comprising the steps of: responsive to the number of segments qualified for packing failing to exceed a predetermined minimum number, blocking a packing operation of the qualified segments.

7. A method of loading a segmented program into a memory for a multitasking data processing system utilizing paged virtual storage for processes as set forth in claim 1, wherein an address for a segment comprises a segment pointer and an offset and an address utilized by the multitasking data processing system is a linear address.

8. A method of loading a segmented program into a memory for a multitasking data processing system utilizing paged virtual storage for processes as set forth in claim 7, the method further comprising the steps of:

providing a virtual storage address space to each process generated upon loading of a program into the memory; and providing address translation for a module calling another module where the respective modules are based upon different addressing schemes.

9. A method of loading a segmented program into a memory for a multitasking data processing system utilizing paged virtual storage for processes as set forth in claim 8, wherein the step of providing address translation includes:

generating a segment descriptor table; and thunking the address utilizing a segment descriptor table.

10. A method of loading a segmented program into a memory for a multitasking data processing system utilizing paged virtual storage for processes as set forth in claim 9, wherein the segment descriptor table is maintained at a lowest read-only protection level in the multitasking data processing system.

11. A method of loading a segmented program into a memory for a multitasking data processing system utilizing paged virtual storage for processes as set forth in claim 1, the method further comprising the steps of:

for each virtual storage address space established, reserving a predetermined standard portion for shared objects marked for packing;

loading a shared object into the same part of the predetermined standard portion for each process; and loading all private objects for each process into a portion of each virtual storage address space reserved therefore.

12. A method of loading a segmented program into a memory for a multitasking data processing system utilizing paged virtual storage for processes as set forth in claim 1, wherein the virtual storage object is sized to fit the segments identified for packing.

13. A method of loading a segmented program into a memory for a multitasking data processing system utilizing paged virtual storage for processes as set forth in claim 1, wherein the step of identifying segments for packing further comprises qualifying segments for packing based on a ratio of memory savings with packing to an increase in swap file size.

14. A method of loading a segmented program into a memory for a multitasking data processing system utilizing paged virtual storage for processes as set forth in claim 1, wherein the step of identifying the segments for packing further includes determining the ratio of available memory to the quantity of free auxiliary storage.

15. A multitasking data processing system for executing application programs written for either of two types of virtual storage system including a segmentation virtual storage system and a demand paging type virtual storage system, the data processing system comprising:

a memory;

means for designating an application program for loading into the memory;

means for determining if the application program was written for segmented virtual storage;

means responsive to determination that the application program was written for segmented virtual storage for establishing a virtual address space having a plurality of pages;

means for identifying segments of the segmented program for packing which are not modified in size during execution of said application program;

means for establishing a virtual storage object over a contiguous portion of the virtual address space;

means for mapping the segments identified for packing into the virtual storage object end-to-end across page boundaries; and means for loading selected segments identified for packing into frames of the memory in accordance with their mapping into the virtual storage object.

16. A multitasking data processing system for executing application programs written for either of two types of virtual storage system including a segmentation virtual storage system and a demand paging type virtual storage system as set forth in claim 15, the data processing system comprising:

means for generating a descriptor table for segments;

means for marking the virtual storage object as swappable; and means for assigning a descriptor from the descriptor table to each segment identified for packing beginning at a selected address within the virtual storage object.

17. A multitasking data processing system for executing application programs written for either of two types of virtual storage system including a segmentation virtual storage system and a demand paging type virtual storage system as set forth in claim 16, and further comprising:

means for creating a virtual storage object for each segment of the segmented program not identified as packable; and means for assigning a descriptor linking each segment not identified as packable to its virtual storage object.

18. A multitasking data processing system for executing application programs written for either of two types of virtual storage system including a segmentation virtual storage system and a demand paging type virtual storage system as set forth in claim 17, wherein the means for loading includes:

means for locating segments of the segmented program which are marked for loading upon creation of a process; and means responsive to any portion of a marked segment being mapped to a page in the virtual address space for loading the marked segments mapped to the page into a frame of the memory.

19. A multitasking data processing system for executing application programs written for either of two types of virtual storage system including a segmentation virtual storage system and a demand paging type virtual storage system as set forth in claim 15, wherein the means for identifying segments of the segmented program for packing further comprises:

means for determining whether a segment is smaller in size than a preselected maximum limit;

means for determining whether the segment is fixed in size;

means for performing a modulo operation on the size of the segment against a size for a page supported by the multitasking data processing system to generate a result;

means for examining the result of said modulo operation to determine whether the segment would leave a block in a frame larger in size than a preselected minimum limit; and means for qualifying for packing only those segments passing all three of the preceding means.

20. A multitasking data processing system for executing application programs written for either of two types of virtual storage system including a segmentation virtual storage system and a demand paging type virtual storage system as set forth in claim 19, and further comprising:

means responsive to the number of segments qualified for packing failing to exceed a predetermined minimum number for blocking a packing operation of the qualified segments.

21. A multitasking data processing system for executing application programs written for either of two types of virtual storage system including a segmentation virtual storage system and a demand paging type virtual storage system as set forth in claim 15, wherein an address for a segment comprises a segment pointer and an offset and an address utilized by the multitasking data processing system is a linear address.

22. A multitasking data processing system for executing application programs written for either of two types of virtual storage system including a segmentation virtual storage system and a demand paging type virtual storage system as set forth in claim 21, and further comprising:

means for providing a virtual storage address space to each process generated upon loading of a program into the memory; and means for translating addresses generated by a module calling another module where the respective modules are based upon different addressing schemes.

23. A multitasking data processing system for executing application programs written for either of two types of virtual storage system including a segmentation virtual storage system and a demand paging type virtual storage system as set forth in claim 15, further comprising:

means responsive to establishment of each virtual storage address space for reserving a predetermined standard portion thereof for shared objects marked for packing;

means for loading a shared object into the same part of the predetermined standard portion for each process; and means for loading all private objects for each process into a portion of each virtual storage address space reserved therefore.

* * * * *